(12) United States Patent
Chuang et al.

(10) Patent No.: US 9,118,632 B1
(45) Date of Patent: Aug. 25, 2015

(54) ANONYMIZING EMAILS BETWEEN SENDER AND RECIPIENT

(71) Applicant: GOOGLE INC., Mountain View, CA (US)

(72) Inventors: Weihaw Chuang, Menlo Park, CA (US); Nicolas Lidzborski, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/656,039

(22) Filed: Mar. 12, 2015

(51) Int. Cl.
*H04L 29/06* (2006.01)
*H04L 9/32* (2006.01)
*H04L 12/58* (2006.01)

(52) U.S. Cl.
CPC ............ *H04L 63/0428* (2013.01); *H04L 9/321* (2013.01); *H04L 9/3263* (2013.01); *H04L 51/28* (2013.01); *H04L 63/0414* (2013.01); *H04L 63/0435* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 6,952,769 B1 * | 10/2005 | Dubey et al. | 713/153 |
| 2005/0198170 A1 * | 9/2005 | LeMay et al. | 709/206 |
| 2007/0245414 A1 | 10/2007 | Chan et al. | |
| 2008/0010348 A1 * | 1/2008 | Dawson et al. | 709/206 |

OTHER PUBLICATIONS

"Bounce Message", from Wikipedia, the free encyclopedia, May 28, 2014, retrieved on Feb. 26, 2015 from http://en.wikipedia.org/wikil, 6 pages.
"Onion Routing", from Wikipedia, the free encyclopedia, Jan. 28, 2015, retrieved on Mar. 9, 2015 from http://en.wikipedia.org/wiki/, 5 pages.
"S/MIme", from Wikipedia, the free encyclopedia, Dec. 27, 2014, retrieved on Dec. 30, 2014 from http://en.wikipedia.org/wiki/, 4 pages.
"Tor (anonymity network)", from Wikipedia, the free encyclopedia, Mar. 6, 2015, retrieved on Mar. 9, 2015 from http://en.wikipediaorg/wiki/, 21 pages.

(Continued)

*Primary Examiner* — Fatoumata Traore
(74) *Attorney, Agent, or Firm* — Brake Hughes Bellermann LLP

(57) ABSTRACT

A sender may generate a primary email including a primary header and a primary body, the primary header including a sender address associated with the sender computing system and the recipient address associated with a recipient client, encrypt at least a part of the primary body to generate a primary encrypted email, encrypt the primary encrypted email to generate an encrypted sender-to-recipient pseudo-body, add a trusted party-to-recipient header to the encrypted sender-to-recipient pseudo-body including a trusted party address of a trusted party and the recipient address associated with the recipient client to generate a trusted party-to-recipient email, encrypt the trusted party-to-recipient email to generate an encrypted trusted party-to-recipient pseudo-body, add a sender-to-trusted party header to the encrypted trusted party-to-recipient pseudo-body including the sender address and the address of the trusted party to generate a sender-to-trusted party email, and send the sender-to-trusted party email to the trusted party.

21 Claims, 13 Drawing Sheets

(56) References Cited

OTHER PUBLICATIONS

"UUCP", from Wikipedia, the free encyclopedia, Feb. 1, 2015, retrieved on Mar. 9, 2015 from http://en.wikipedia.org/wiki/, 6 pages.
Freed, "Re: [ietf-smtp] DKIM encryption, was Request for discussion", Oct. 19, 2013, retrieved on Dec. 30, 2014 from http://www.iettorg/mail-archive/web/ietf-smtp/current/msg07617.html, 2 pages.
Hansen, et al., "DomainKeys Identified Mail (DKIM) Service Overview", Network Working Group, Jun. 2009, 23 pages.
Housley, et al, "Internet X.509 Public Key Infrastructure Certificate and Certificate Revocation List (CRL) Profile", Network Working Group, Apr. 2002, 129 pages.
Housley, et al, "Internet X.509 Public Key Infrastructure Certificate and CRL Profile", Network Working Group, Jan. 1999, 129 pages.
Igoe, "X.509v3 Certificates for Secure Shell Authentication", IETF, Mar. 2011, 16 pages.
Kangas, "SMTP TLS: All About Secure Email Delivery over TLS", LuxSci FYI Blog, Dec. 30, 2014, 6 pages.
Ramsdell, et al., "Secure/Multipurpose Internet Mail Extensions (S/MIME) Version 3.2—Certificate Handling", IETF, Jan. 2010, 21 pages.
Levison, et al, "Dark Internet Mail Environment", Architecture and Specifications, Dark Mail Technical Alliance, World Wide Web, Dec. 2014, 108 pages.

* cited by examiner

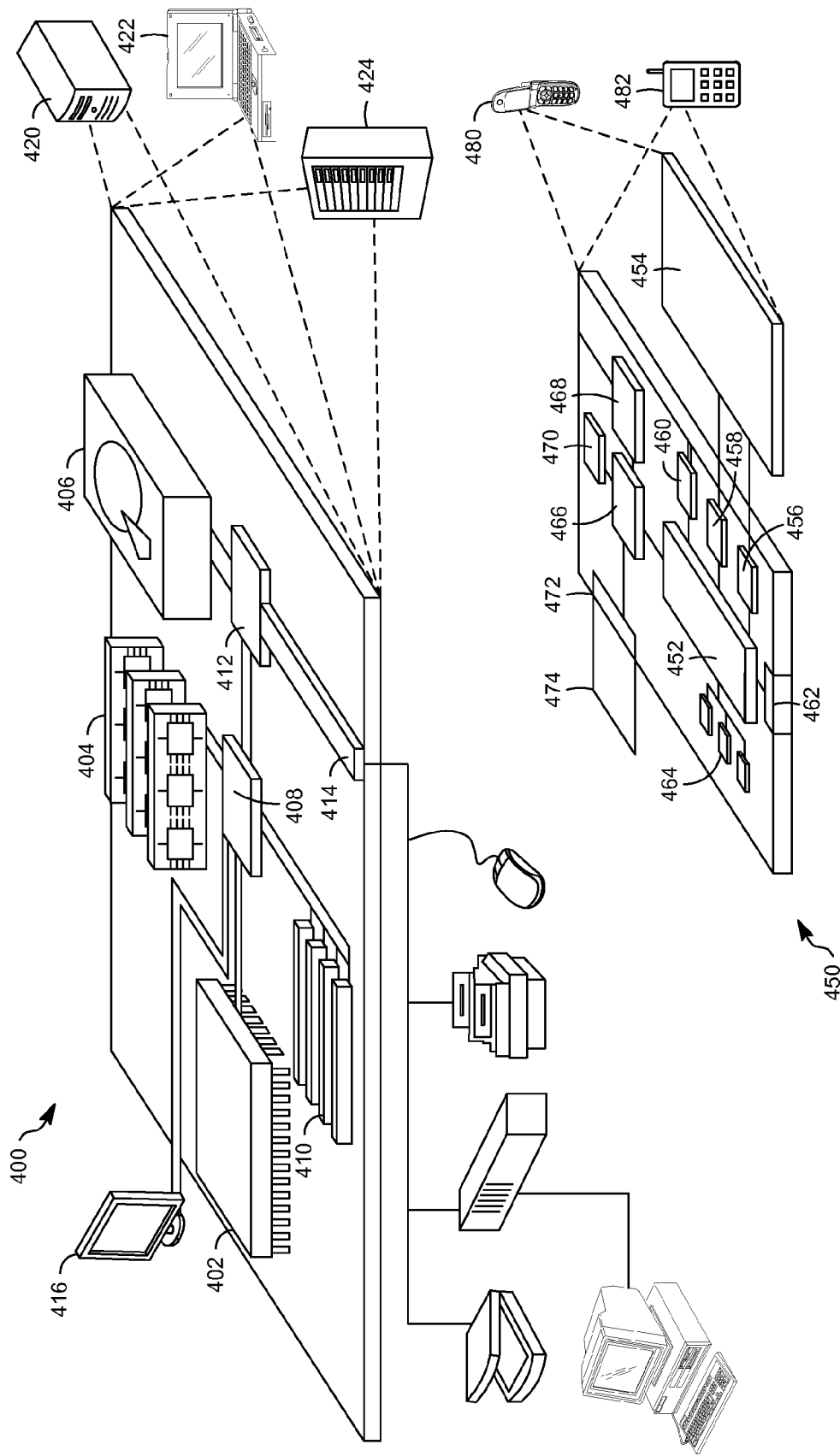

ANONYMIZING EMAILS BETWEEN SENDER AND RECIPIENT

TECHNICAL FIELD

This description relates to electronic communication such as email.

BACKGROUND

Persons may communicate with each other via electronic means, such as email. Encrypting the contents of the email may protect the contents, but the senders and recipients of the emails may be determined by unauthorized persons by reading header information in the emails. These unauthorized persons may thereby learn how many emails are sent, and when the emails are sent, between a particular sender and recipient.

SUMMARY

According to an example implementation, a non-transitory computer-readable storage medium may include instructions stored thereon for protecting a recipient address within a primary email. When executed by at least one processor, the instructions may be configured to cause a sender computing system to at least generate the primary email, the primary email including a primary header and a primary body, the primary header including a sender address associated with the sender computing system and the recipient address associated with a recipient client, encrypt at least a part of the primary body to generate a primary encrypted email, encrypt the primary encrypted email to generate an encrypted sender-to-recipient pseudo-body, add a trusted party-to-recipient header to the encrypted sender-to-recipient pseudo-body, the trusted party-to-recipient header including a trusted party address of a trusted party and the recipient address associated with the recipient client, to generate a trusted party-to-recipient email, encrypt the trusted party-to-recipient email to generate an encrypted trusted party-to-recipient pseudo-body, add a sender-to-trusted party header to the encrypted trusted party-to-recipient pseudo-body, the sender-to-trusted party header including the sender address and the address of the trusted party, to generate a sender-to-trusted party email, and send the sender-to-trusted party email to the trusted party.

According to another example implementation, a non-transitory computer-readable storage medium may include instructions stored thereon for forwarding a sender-to-trusted party email to a trusted party server associated with a recipient client. When executed by a least one processor, the instructions may be configured to cause a trusted party computing system associated with a sender client to at least receive, from the sender client, a sender-to-trusted party email, the sender-to-trusted party email including a sender-to-trusted party header including a sender address associated with the sender client and a first trusted party address associated with the trusted party computing system, and an encrypted trusted party-to-trusted party pseudo-body. The instructions may also be configured to cause the trusted party computing system to remove the sender-to-trusted party header from the sender-to-trusted party email, decrypt the encrypted trusted party-to-trusted party pseudo-body to generate a trusted party-to-trusted party email, the trusted party-to-trusted party email including a trusted party-to-trusted party header and an encrypted trusted party-to-recipient pseudo-body, the trusted party-to-trusted party header including the first trusted party address and a second trusted party address associated with the trusted party server associated with the recipient client, and send the trusted party-to-trusted party email to the trusted party server associated with the recipient client.

According to another example implementation, a non-transitory computer-readable storage medium may include instructions stored thereon for forwarding a sender-to-trusted party email to a recipient client. When executed by a least one processor, the instructions may be configured to cause a trusted party computing system to at least receive, from a sender client, a sender-to-trusted party email, the sender-to-trusted party email including a sender-to-trusted party header including a sender address associated with the sender client and a trusted party address associated with the trusted party computing system, and an encrypted trusted party-to-recipient pseudo-body. The instructions may also be configured to cause the trusted party computing system to remove the sender-to-trusted party header from the sender-to-trusted party email, decrypt the encrypted trusted party-to-recipient pseudo-body to generate a trusted party-to-recipient email, the trusted party-to-recipient email including a trusted party-to-recipient header and an encrypted sender-to-recipient pseudo-body, the trusted party-to-recipient header including the trusted party address associated with the trusted party computing system and a recipient address associated with the recipient client, the encrypted sender-to-recipient pseudo-body including an encrypted email from the sender client to the recipient client, and send the trusted party-to-recipient email to the recipient client.

According to another example implementation, a non-transitory computer-readable storage medium comprising instructions stored thereon for forwarding a primary email to a trusted party server associated with a recipient client. When executed by a least one processor, the instructions may be configured to cause a trusted party computing system associated with a sender client to at least receive, from the sender client via a secure network, a primary email, the primary email including a header and an unencrypted body, encrypt the body of the email to generate a primary encrypted email, encrypt the primary encrypted email to generate an encrypted sender-to-recipient pseudo-body, add a trusted party-to-trusted party header to the encrypted sender-to-recipient pseudo-body to generate a trusted party-to-trusted party email, and send the trusted party-to-trusted party email to the trusted party server via an unsecure network.

The details of one or more implementations are set forth in the accompanying drawings and the description below. Other features will be apparent from the description and drawings, and from the claims.

BRIEF DESCRIPTION OF THE DRAWINGS

FIG. 4 shows an example of a computer device and a mobile computer device that can be used to implement the techniques described here.

Like reference numbers refer to like elements.

DETAILED DESCRIPTION

Figure 1A:
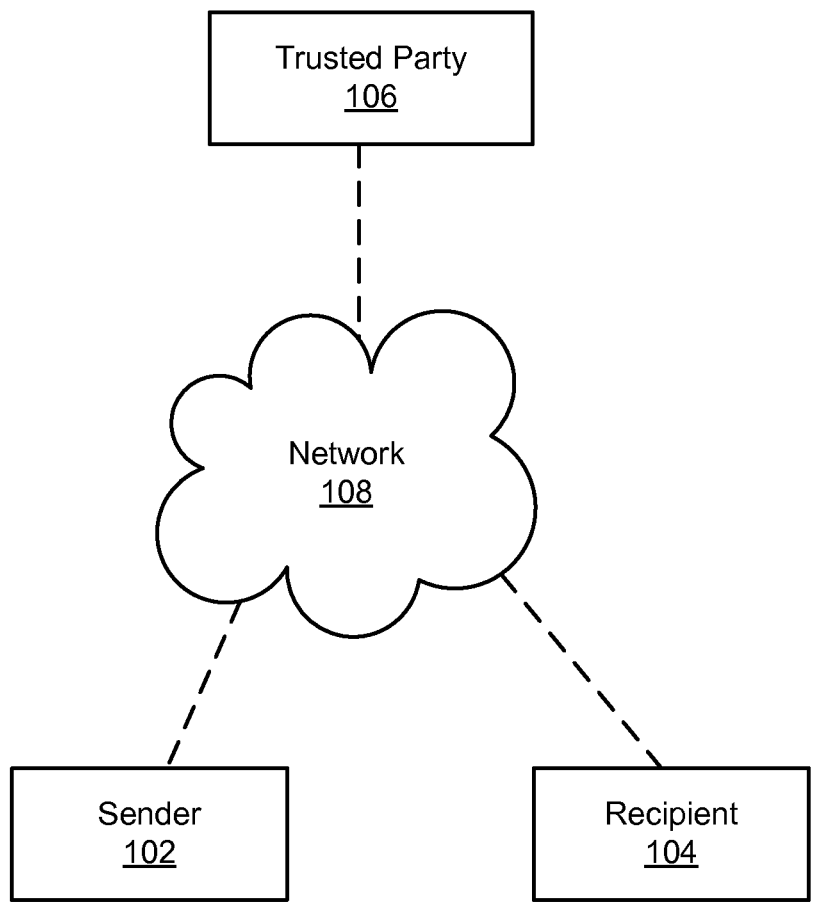
FIG. 1A shows a sender, a trusted party, a recipient, and a network shared between the sender, trusted party, and recipient.

Emails between a sender and a recipient may be anonymized by sending the emails to one or more trusted parties that forward the emails to the recipient. The original emails, including a header which includes addresses of the sender and recipient, may be encrypted, and sent to the trusted party. The trusted party may forward the encrypted emails to the recipient. When sent from the sender to the trusted party, a header of the email may identify the sender and trusted party, with a body of the email encrypted, so that the recipient may not be determined. When sent from the trusted party to the recipient, a header of the email may identify the trusted party and the recipient, with a body of the email encrypted, so that the original sender may not be determined.

In one example, the emails may be sent to and forwarded from a single trusted party, which may be associated with either the sender or the recipient. In another example, the emails may be sent and forwarded to and from multiple trusted parties such as two trusted parties including a first trusted party associated with the sender and a second trusted party associated with the recipient, with the first trusted party forwarding the email from the sender to the second trusted party and the second trusted party forwarding the email from the first trusted party to the recipient.

In an example implementation, the sender may employ onion-routing to anonymize the email by routing the email through the trusted party. The sender may encrypt a primary email to form an encrypted sender-to-recipient pseudo-body. The sender may add a trusted party-to-recipient header to the encrypted sender-to-recipient pseudo-body to form a trusted party-to-recipient email. The sender may encrypt the trusted party-to-recipient email to form an encrypted trusted party-to-recipient pseudo-body. In an example of one trusted party, the sender may add a sender-to-trusted party header to the encrypted trusted party-to-recipient pseudo-body to form a sender-to-trusted party email. The sender may then send the sender-to-trusted party email to the trusted party.

Upon receipt of the sender-to-trusted party email, the trusted party may remove the sender-to-trusted party header and decrypt the encrypted trusted party-to-recipient pseudo-body to re-form the trusted party-to-recipient email. The trusted party may then send the trusted party-to-recipient email to the recipient.

Upon receipt of the trusted party-to-recipient email, the recipient may remove the trusted party-to-recipient header and decrypt the encrypted sender-to-recipient pseudo-body to re-form the sender-to-recipient email. The recipient may then read the contents of the sender-to-recipient email.

In an example with two trusted parties, the sender may also add a trusted party-to-trusted party header to the encrypted trusted party-to-recipient pseudo-body to form a trusted party-to-trusted party email, encrypt the trusted party-to-trusted party email to form an encrypted trusted party-to-trusted party pseudo-body, and add the sender-to-trusted party header to the encrypted trusted party-to-trusted party pseudo-body to form the sender-to-trusted party email.

In the example with two trusted parties, a first of the two trusted parties, which may be associated with the sender, may remove the sender-to-trusted party header and decrypt the encrypted trusted party-to-trusted party pseudo-body to re-form the trusted party-to-trusted party email. The first trusted party may then send the trusted party-to-trusted party email to a second of the two trusted parties, which may be associated with the recipient.

In the example with two trusted parties, upon receiving the trusted party-to-trusted party email, the second trusted party may remove the trusted party-to-trusted party header and decrypt the encrypted trusted party-to-recipient pseudo-body to re-form the trusted party-to-recipient email. The second trusted party may then send the trusted party-to-recipient email to the recipient.

In the example with two trusted parties, the recipient may receive the trusted party-to-recipient email from the second trusted party, remove the trusted party-to-recipient header, and decrypt the encrypted sender-to-recipient pseudo-body to reform the original email. The recipient may then read the contents of the original email.

FIG. 1A shows a sender 102, a trusted party 106, a recipient 104, and a network 108 shared between the sender 102 which may be considered a sender client, the trusted party 106, and the recipient 104 which may be considered a recipient client. The sender 102 may route emails to the recipient 104 through the trusted party 106 to anonymize the emails, preventing unauthorized parties from determining which emails were sent from the sender 102 to the recipient 104. The network 108 may be a shared network, such as the Internet.

Figure 1B:
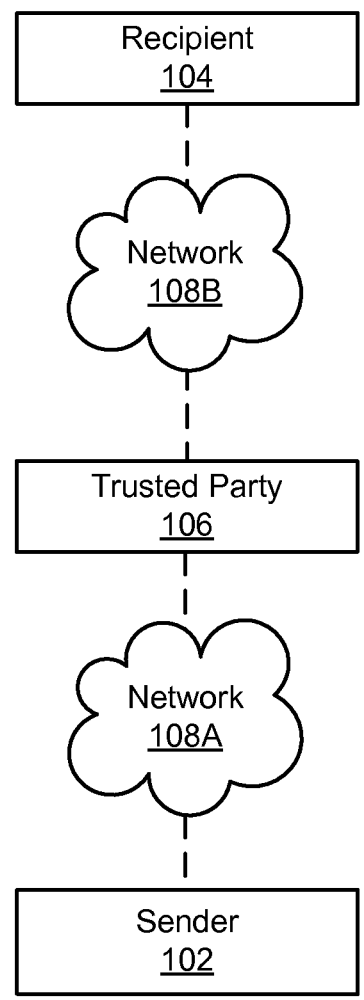
FIG. 1B shows a sender, a trusted party, a network shared between the sender and the trusted party, a recipient, and a network shared between the trusted party and the recipient.

FIG. 1B shows the sender 102, the trusted party 106, a network 108A shared between the sender 102 and the trusted party 106, the recipient 104, and a network shared 108B between the trusted party 106 and the recipient 104. In this example, the networks 108A, 108B may be local networks, private networks, intranets, and/or secure connections through a public network such as a connection using Transport Layer Security (TLS) encryption, reducing opportunities for unauthorized parties to retrieve the contents of any email.

Figure 1C:
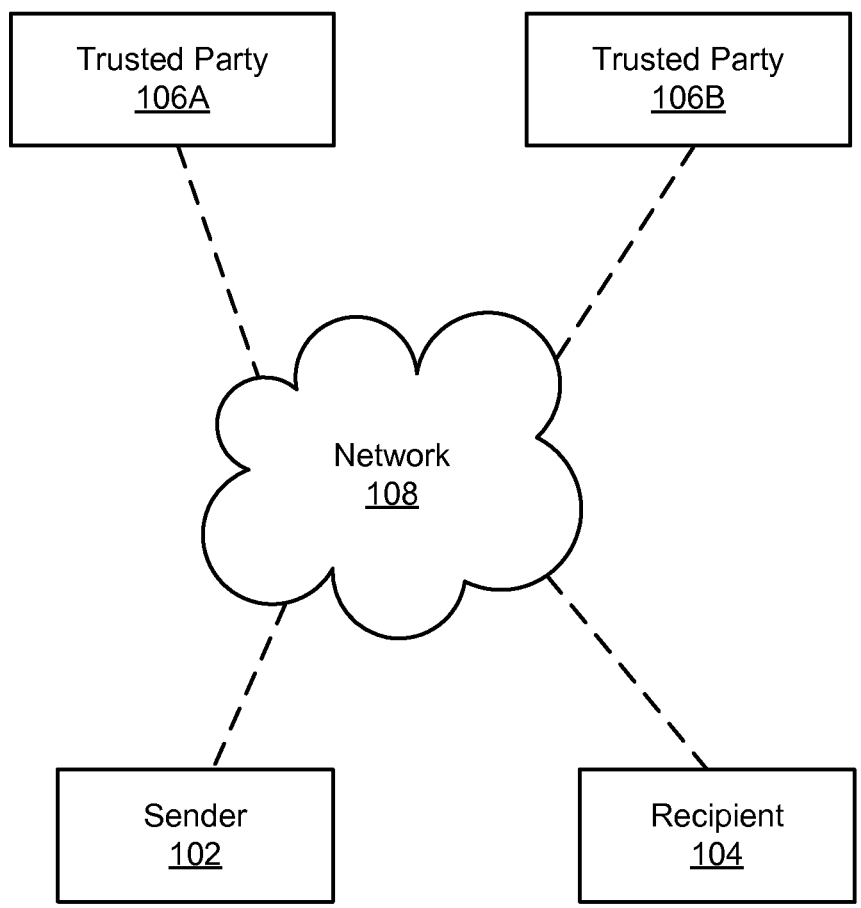
FIG. 1C shows a sender, a first trusted party, a second trusted party, a recipient, and a network shared between the sender, first trusted party, second trusted party, and recipient.

FIG. 1C shows the sender 102, a first trusted party 106A, a second trusted party 106B which may be considered a trusted party server, the recipient 104, and the network 108 shared between the sender 102, first trusted party 106A, second trusted party 106B, and recipient 104. In this example, the sender may anonymize emails to the sender by routing them to the first trusted party 106A, which may be associated with the sender 102 such as by a shared domain, then to the second trusted party 106B, which may be associated with the recipient such as by a shared domain, to the recipient 104. In examples with two or more trusted parties, local networks, private networks, and/or intranets may be used, such as between the sender 102 and the first trusted party 106A associated with the sender, and between the recipient 104 and the second trusted party 106B associated with the recipient 104, thereby reducing opportunities for unauthorized parties to retrieve the contents of any email. In an example implementation, the trusted parties 106A, 106B may communicate via a local network, private network, intranet, and/or a direct communication line such as a fiber optic cable.

Figure 1D:
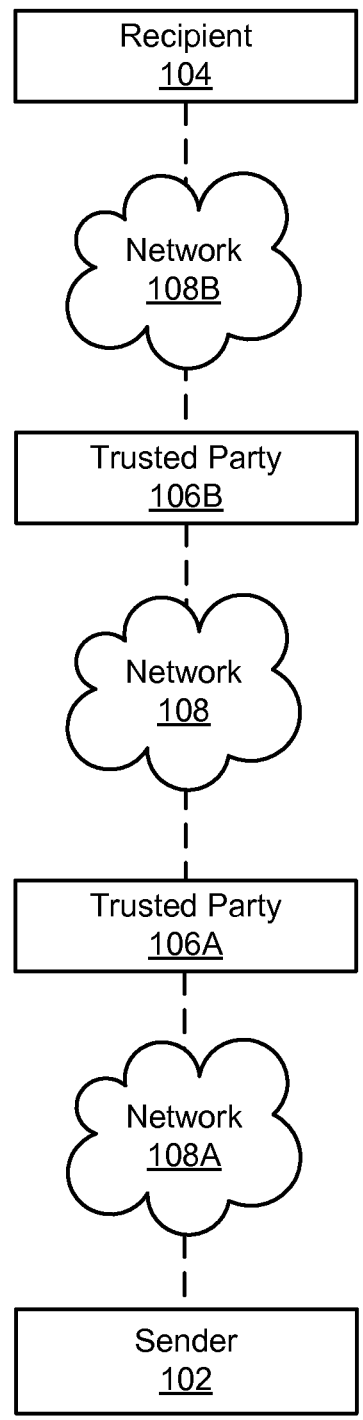
FIG. 1D shows a sender, a first trusted party, a second trusted party, a recipient, a network shared between the sender and the first trusted party, a network shared between the first trusted party and the second trusted party, and a network shared between the second trusted party and the recipient.

FIG. 1D shows a sender 102, a first trusted party 106A, a second trusted party 106B, a recipient 104, a network 108A shared between the sender 102 and the first trusted party 106A, a network 108 shared between the first trusted party 106A and the second trusted party 106B, and a network 108B shared between the second trusted party 106B and the recipient 104. In this example, the network 108A may be a safe and/or trusted network between the sender 102 and the first trusted party 106A, and may be a local network, private network, intranet, and/or a secure communication channel through a public network such as a connection via the Internet using TLS encryption. The network 108 may be a public, unsafe, and/or untrusted network, such as the Internet. The network 108B may be a safe and/or trusted network between the second trusted party 106B and the recipient 104, and may be a local network, private network, intranet, and/or a secure communication channel.

Figure 2A:
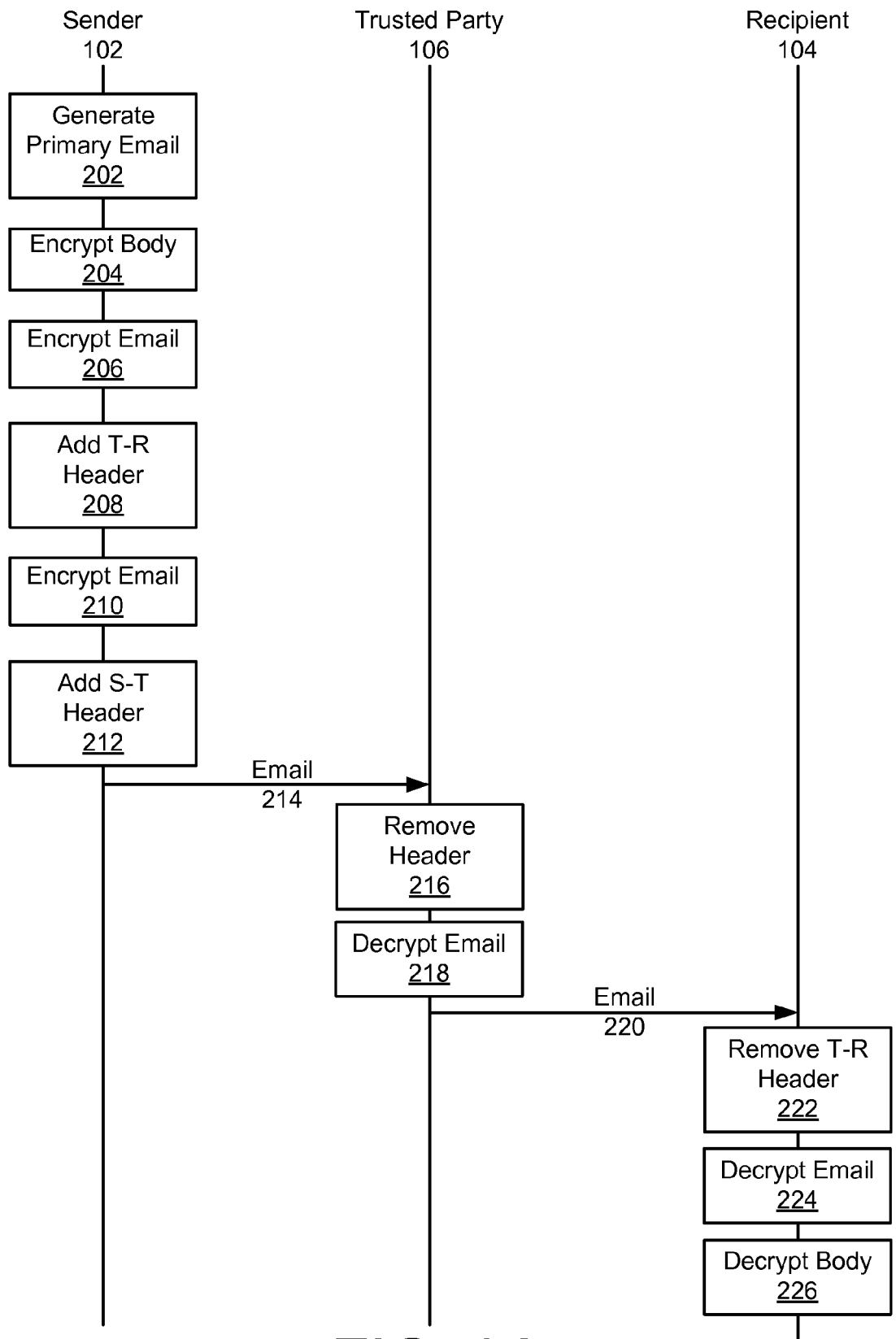
FIG. 2A is a timing diagram showing operations performed by, and messages sent between, a sender, a trusted party, and a recipient.

FIG. 2A is a timing diagram showing operations performed by, and messages sent between, the sender 102, the trusted party 106, and the recipient 104. The sender 102 may generate a primary email (202).

Figure 3A:
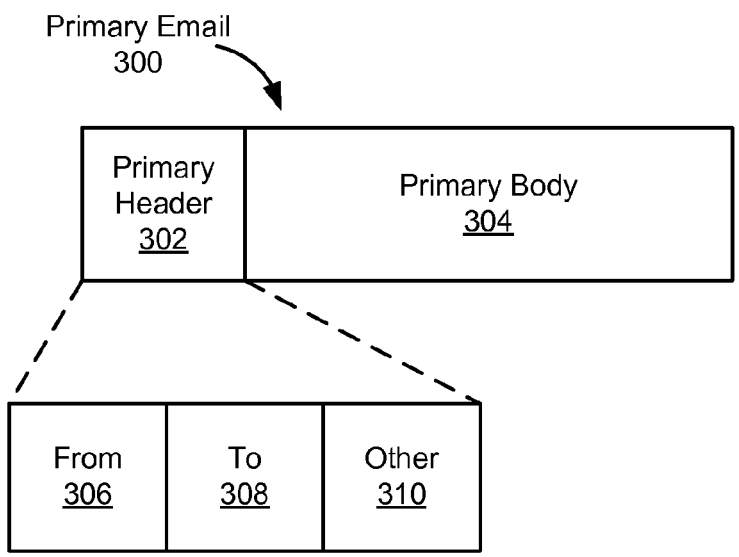
FIG. 3A is a block diagram of a primary email.

An example of the primary email 300 is shown in FIG. 3A. In this example, the primary email 300 may include a primary header 302 and a primary body 304. The primary header 302 may include routing information such as a from field 306 that includes an address of the sender 102 which may be considered a sender address, a to field 308 that includes an address of the recipient 104 which may be considered a recipient address, and any other 310 information. The primary body 304 may include the contents of the primary email 300 that the sender 102 is sending to the recipient 104.

Figure 3B:
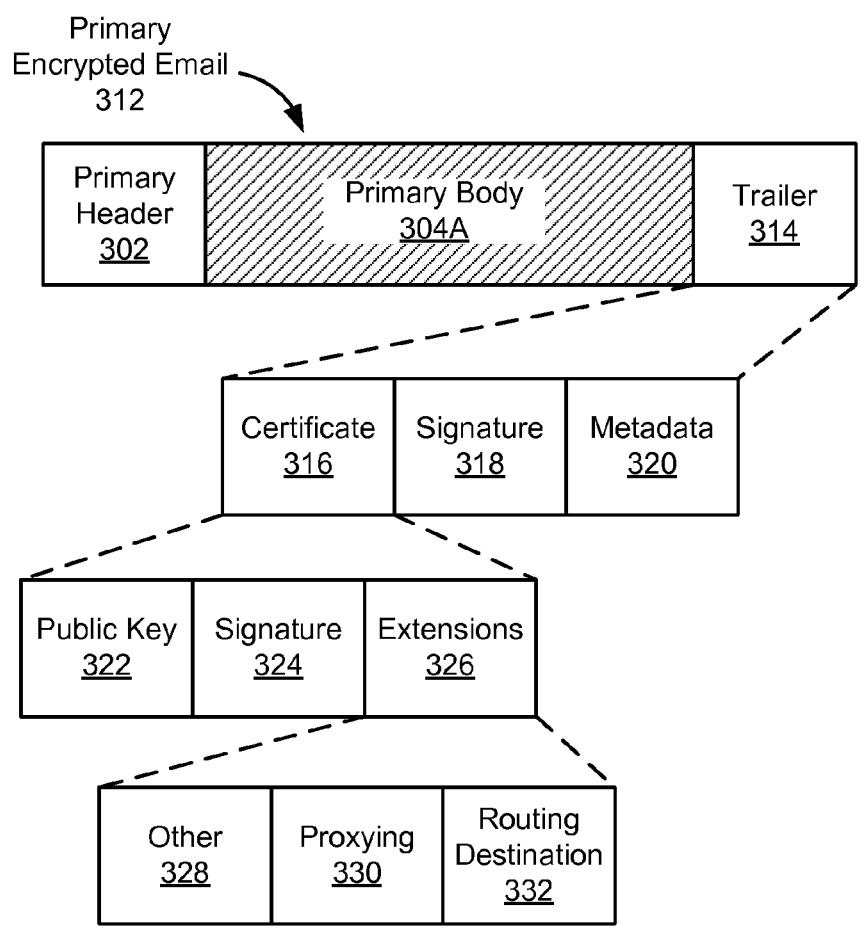
FIG. 3B is a block diagram of a primary encrypted email.

Returning to FIG. 2A, the sender 102 may encrypt the body of the email (204). As shown in FIG. 3B, the primary body 304 may be encrypted to form an encrypted primary body 304A, generating a primary encrypted email 312.

The sender 102 may also add a trailer 314 to the primary encrypted email 312. The trailer 314 may include authentication, routing, and decryption information for the recipient 104. The trailer 314 may include, for example, a certificate 316 which may include an X.509 certificate, a signature 318 authenticating the sender 102 to the recipient 104, and metadata 320. The signature 318 may be considered a primary encrypted email signature that authenticates the sender 102, and may be based on a private key associated with the sender 102.

The certificate 316 may be associated with the trusted party 106 (or in the example described with respect to FIG. 2B, the trusted party 106A), and may be included in a chain of certificates from a PKI certificate associated with the sender 102 and a trusted root. The certificate 316 may include a public key 322 associated with an entity that created the certificate 316, a certificate signature 324 authenticating the certificate 316 and based on a private key of an entity that issued the certificate 316, and extensions 326. The public key 322 may include a public key included in a public key infrastructure certificate. The public key 322 may enable the sender 102 to communicate with the recipient 104 privately by encrypting messages using the public key 322. The certificate 316 may also include other fields not shown in FIG. 3B.

The extensions 326 may include a first extension and/or proxying extension 330 declaring that the public key 322 included in the certificate 316 may be used for proxying. The proxying extension 330 may declare that the public key 322 included in the certificate 316 will be used to proxy the primary email 300 via the trusted party 106 (or in the example described with respect to FIG. 2B, via the trusted parties 106A, 106B).

Figure 3C:
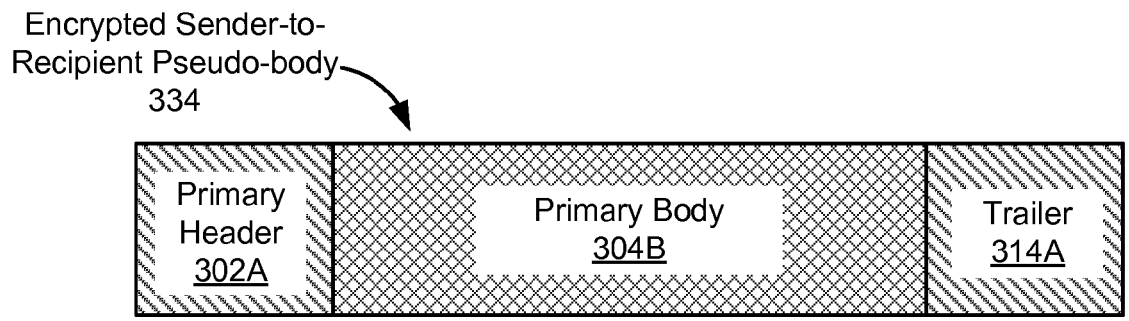
FIG. 3C is a block diagram of an encrypted sender-to-recipient pseudo-body.

The extensions 326 may also include a second extension and/or routing destination extension 332 indicating the path of the primary encrypted email 312. The routing destination extension 332 may indicate one or more email addresses, such as the trusted party 106 or trusted parties 106A, 106B via which the primary encrypted email 312 will be sent and identifying the proxy account(s) that will decrypt the emails with the public key 322 included in the certificate 316 and forward the emails to the recipient 104. The routing destination extension 332 may specify the address of the trusted party 106 and indicate that the trusted party 106 will decrypt the encrypted sender-to-recipient pseudo-body 334 (shown and described with respect to FIG. 3C) and forward the primary encrypted email 312 to the recipient 104.

The metadata 320 may include a symmetric key according to which the primary body 304 was encrypted to form the encrypted primary body 304A, and which may be used to decrypt the primary body 304A. To prevent unauthorized parties from accessing the symmetric key and decrypting the encrypted primary body 304A, the symmetric key included in the metadata 320 may be encrypted using a public key associated with the recipient 104, allowing the recipient 104 to decrypt the symmetric key using a private key associated with the recipient 104, to retrieve the symmetric key and decrypt the encrypted primary body and retrieve the primary body 304. As described herein, public keys may include public keys that are part of one or more public key infrastructures (PKI). All of the public keys, and corresponding private keys, described herein, may be part of a same PKI, or may be part of different PKIs.

Returning to FIG. 2A, the sender 102 may encrypt the primary encrypted email 312 (206). The sender 102 may encrypt the entire primary encrypted email 312 to generate an encrypted sender-to-recipient pseudo-body 334 shown in FIG. 3C. The entire primary encrypted email 312 may be encrypted to generate the encrypted sender-to-recipient pseudo-body 334 using a symmetric key included in a trusted party-to-recipient trailer 340, described below.

After encrypting the primary encrypted email 312 to generate the encrypted sender-to-recipient pseudo-body 334 (206), the sender may add a trusted party-to-recipient header 338 (shown in FIG. 3D) to the encrypted sender-to-recipient pseudo-body 334 (208). Adding the trusted party-to-recipient header 338 to the encrypted sender-to-recipient pseudo-body 334 may generate the trusted party-to-recipient email 336 shown in FIG. 3D. The trusted party-to-recipient email 336 may include the trusted party-to-recipient header 338, which may include an address of the trusted party 106 which may be considered a trusted party address and the address of the recipient 104, the encrypted sender-to-recipient pseudo-body 334, and a trusted party-to-recipient trailer 340.

The trusted party-to-recipient trailer 340 may include similar fields to the trailer 314 described above with reference to FIG. 3B, including a symmetric key used to encrypt the encrypted sender-to-recipient pseudo-body 334. The symmetric key used to encrypt the encrypted sender-to-recipient pseudo-body 334 may be encrypted according to a public key associated with the recipient 104, allowing the recipient 104 to decrypt the symmetric key using a private key associated with the recipient and use the symmetric key to decrypt the encrypted sender-to-recipient pseudo-body 334 to re-form the primary encrypted email 312.

Returning to FIG. 2A, the sender 102 may encrypt the trusted party-to-recipient email 336 to generate an encrypted trusted party-to-recipient pseudo-body 336A (210). The encrypted trusted party-to-recipient pseudo-body 336A is shown in FIG. 3E. The sender 102 may encrypt a portion of, or the entire, trusted party-to-recipient email 336 to generate an encrypted trusted party-to-recipient pseudo-body 336A according to a symmetric key included in a sender-to-trusted party trailer 352 described below with reference to FIG. 3H.

After encrypting the trusted-party-to-recipient email 336 (210), the sender 102 may add a sender-to-trusted party header 350 to the encrypted trusted party-to-recipient pseudo-body 336A (212). Referring to FIG. 3H, adding the sender-to-trusted party header 350 to the encrypted trusted party-to-recipient pseudo-body 336A (shown in FIG. 3E) may generate a sender-to-trusted party email 348. The encrypted pseudo-body 360 is shown generically in FIG. 3H to encompass at least the example of including the encrypted trusted party-to-recipient pseudo-body shown in FIG. 3E and described with reference to FIG. 2A, and the example of including an encrypted trusted party-to-trusted party pseudo-body 342A shown in FIG. 3G and described with reference to FIG. 2B.

Generating the sender-to-trusted party email 348 may also include adding a sender-to-trusted party trailer 352. The sender-to-trusted party trailer 352 may include fields similar to the trailer 314 described above with reference to FIG. 3B. The sender-to-trusted party trailer 352 may include a symmetric key that the sender 102 used to encrypt the encrypted pseudo-body 360, and which the trusted party 106 may use to decrypt the encrypted pseudo-body 360 to re-form the trusted party-to-recipient email 336. The symmetric key used to encrypt the encrypted pseudo-body 360 may be encrypted according to a public key associated with the trusted party 106, so that the trusted party 106 may decrypt and/or retrieve the symmetric key using a private key associated with the trusted party 106.

The sender 102 may send the sender-to-trusted party email 348 to the trusted party 106 (214). The sender 102 may send the sender-to-trusted party email 348 to the trusted party 106 via any transmission means, such as a wired or wireless interface, and may send the sender-to-trusted party email 348 to the trusted party 106 via a network such as a public network 108 or private network 108A described above, or any combination thereof.

The trusted party 106 may receive the sender-to-trusted party email 348 and remove the sender-to-trusted party header 350 (216). The trusted party 106 may also decrypt the encrypted trusted party-to-recipient pseudo-body 336A (218) to re-form and/or retrieve the trusted party-to-recipient email 336. The trusted party 106 may decrypt the encrypted trusted party-to-recipient pseudo-body 336A using the symmetric key included in the sender-to-trusted party trailer 352. The trusted party 106 may decrypt the symmetric key included in the sender-to-trusted party trailer 352 using a private key associated with the trusted party 106. The trusted party 106 may also remove the sender-to-trusted party trailer 352 to re-form and/or retrieve the trusted party-to-recipient email 336.

After decrypting the email (218) to generate the trusted party-to-recipient email 336, the trusted party 106 may send the trusted party-to-recipient email 336 to the recipient 104 (220). After receiving the trusted party-to-recipient email 336 from the trusted party 106, the recipient 104 may remove the trusted party-to-recipient header 338 from the trusted party-to-recipient email 336 (222). The recipient 104 may also decrypt the encrypted sender-to-recipient pseudo-body 334 to re-form and/or generate the primary encrypted email 312. The recipient 104 may decrypt the encrypted sender-to-recipient pseudo-body 334 using the symmetric key included in the trusted party-to-recipient trailer 340. The recipient 104 may decrypt the symmetric key included in the trusted party-to-recipient trailer 340 using a private key associated with the recipient 104.

The recipient 104 may decrypt the primary body 304 of the primary encrypted email (226). The recipient 104 may decrypt the primary body 304 using the symmetric key included in the metadata 320 of the trailer 314. The recipient 104 may decrypt the symmetric key included in the metadata 320 of the trailer 314 using a private key associated with the recipient 104. The recipient 104 may also remove the trailer 314 to re-form and/or generate the primary email 300 that the sender 102 generated and intended for the recipient 104.

Figure 2B:
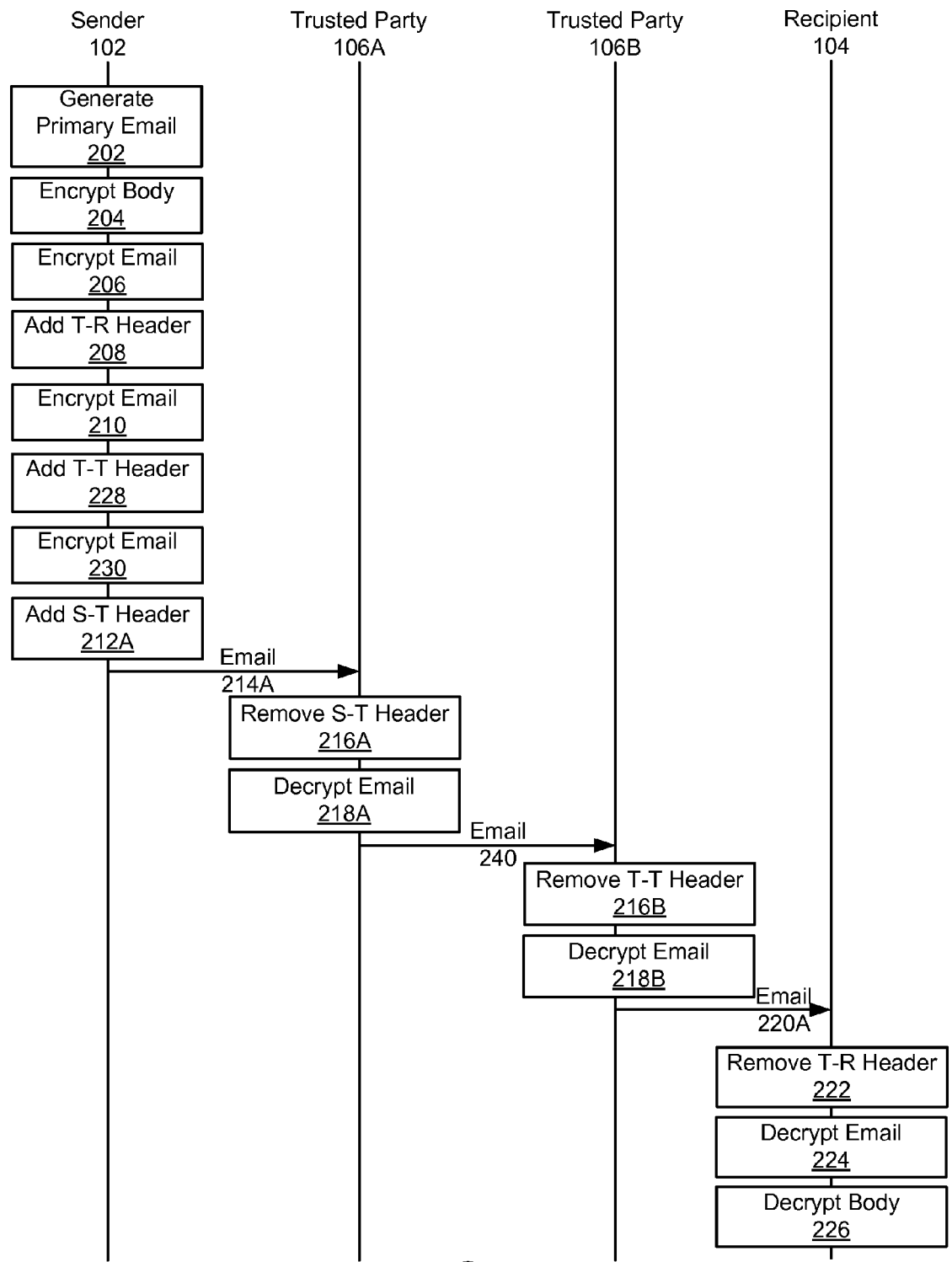
FIG. 2B is a timing diagram showing operations performed by, and messages sent between, a sender, a first trusted party, a second trusted party, and a recipient.
Figure 3D:
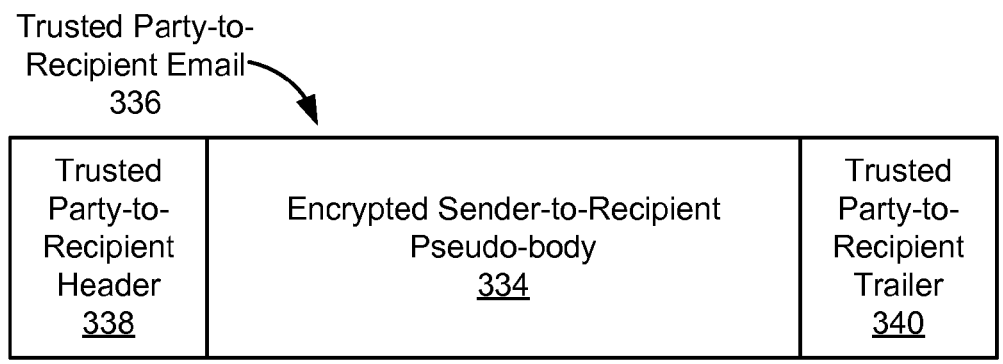
FIG. 3D is a block diagram of a trusted party-to-recipient email.
Figure 3E:
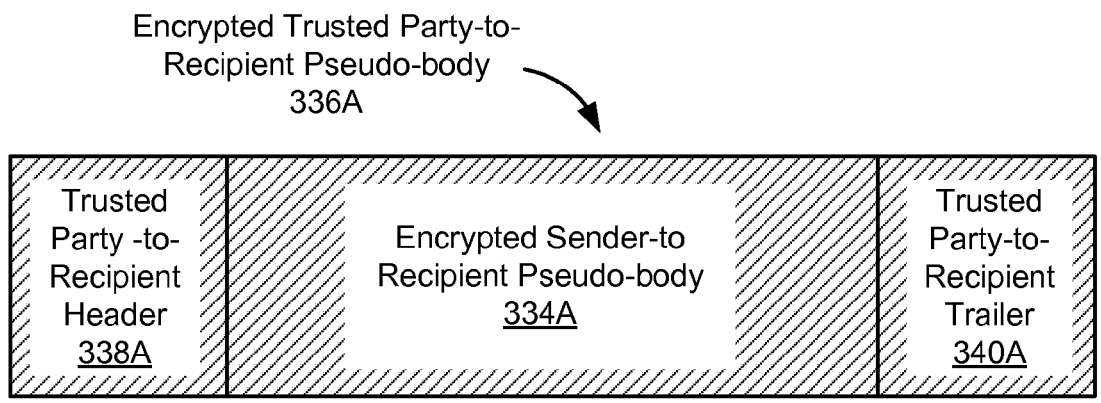
FIG. 3E is a block diagram of an encrypted trusted party-to-recipient pseudo-body.

FIG. 2B is a timing diagram showing operations performed by, and messages sent between, the sender 102, the first trusted party 106A, the second trusted party 106B, and the recipient 104. In this example, the sender 102 may generate the primary email (202), encrypt the body 304 (204), encrypt the email 312 (206), add the trusted party-to-recipient header 338 (208), and encrypt the email 336 (210) as described above with respect to FIG. 2A.

Figure 3F:
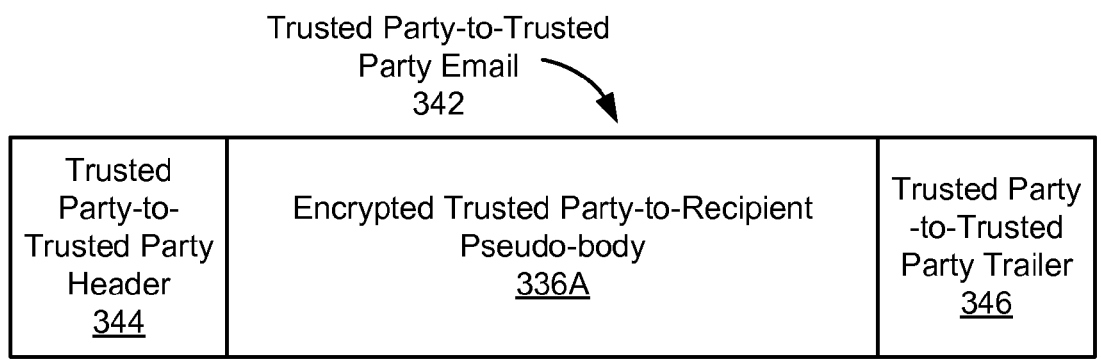
FIG. 3F is a block diagram of a trusted party-to-trusted party email.

In this example with two trusted parties 106A, 106B, the sender 102 may add a trusted party-to-trusted party header 344 to the trusted party-to-recipient pseudo-body 336A (228) to generate a trusted party-to-trusted party email 342, as shown in FIG. 3F. The trusted party-to-trusted party header 344 may include a from field including an address of the trusted party 106A, which may be considered a first trusted party address, and a to field including an address of the trusted party 106B, which may be considered a second trusted party address. The sender 102 may also add a trusted party-to-trusted party trailer 346 to the trusted party-to-recipient pseudo-body 336A. The trusted party-to-trusted party trailer 346 may include fields similar to the trailer 314 shown and described with respect to FIG. 3B. The symmetric key included in the trusted party-to-trusted party trailer 346 may have been encrypted according to a public key associated with the trusted party 106A associated with the sender, and may have been used to encrypt the encrypted trusted party-to-recipient pseudo-body 336A.

Figure 3G:
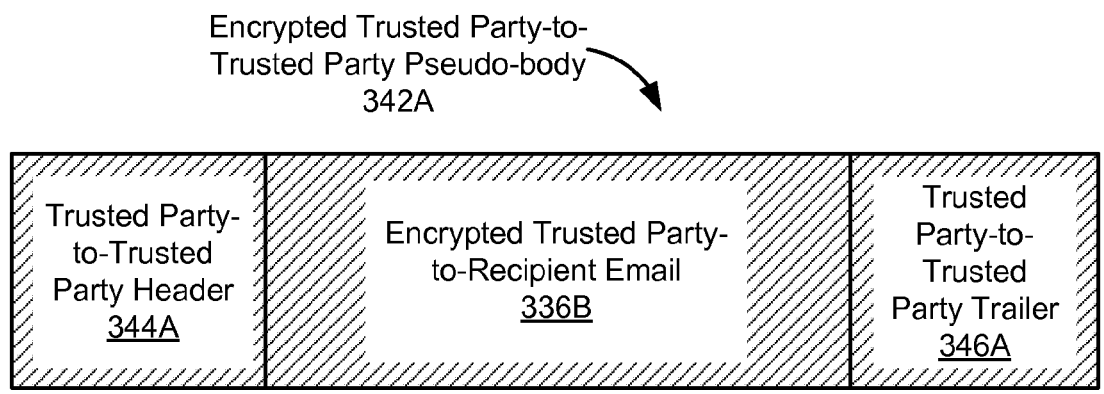
FIG. 3G is a block diagram of an encrypted trusted party-to-trusted party pseudo-body.
Figure 3H:
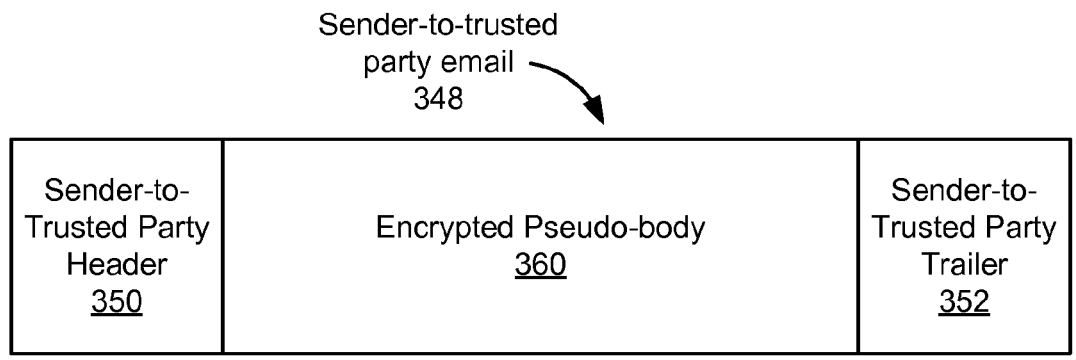
FIG. 3H is a block diagram of a sender-to-trusted party email.

In this example, the sender 102 may encrypt the trusted party-to-trusted party email 342 (230) to form an encrypted trusted party-to-trusted party pseudo-body 342A, as shown in FIG. 3G. The sender 102 may encrypt the trusted party-to-trusted party email 342 using the symmetric key included in the sender-to-trusted party trailer 352 shown in FIG. 3H. The sender 102 may have encrypted the symmetric key included in the sender-to-trusted party trailer 352 using a public key associated with the trusted party 106A.

The sender 102 may add the sender-to-trusted party header 350 to the trusted party-to-trusted party header 344 (212A), similar to adding the sender-to-trusted party header 350 to the trusted party-to-recipient email 336 (212) as described above with respect to FIG. 2A. In the example of FIG. 2B, the encrypted pseudo-body 360 may include the encrypted trusted party-to-trusted party pseudo-body 342A shown in FIG. 3G. The sender 102 may send the sender-to-trusted party email 348 to the trusted party 106A (214A), similar to sending the trusted party email 348 to the trusted party 106 (214), as described above with respect to FIG. 2A.

After receiving the sender-to-trusted party email 348, the trusted party 106A may remove the sender-to-trusted party header 350 shown in FIG. 3H (216A). The trusted party 106A may also decrypt the encrypted pseudo-body 360 (218A), which in this example is the encrypted trusted party-to-trusted party pseudo-body 342A shown in FIG. 3G, to re-form and/or generate the trusted party-to-trusted party email 342 shown in FIG. 3F. The trusted party 106A may decrypt the encrypted trusted party-to-trusted party pseudo-body 342A using a symmetric key included in the sender-to-trusted party trailer 352, which may have been encrypted according to a public key associated with the trusted party 106A and which the trusted party 106A may decrypt according to a private key associated with the trusted party 106A. The trusted party 106A may also remove the sender-to-trusted party trailer 352 from the sender-to-trusted party email 348. The trusted party 106A may send the trusted party-to-trusted party email 342 to the trusted party 106B (240).

If the trusted party-to-trusted party email 342 is not successfully received by the trusted party 106B, a non-delivery notification report/receipt (NDR), (failed) delivery status notification (DSN) message, non-delivery notification (NDN), and/or a "bounce-back message" may be sent to and/or received by the trusted party 106A informing the trusted party 106A that the email 342 was not successfully received by the trusted party 106B. The message may not include an address of the sender 102, protecting the identity of the sender 102. Instead of including the address of the sender 102, the message may include the addresses of the trusted parties 106A, 106B.

In an example implementation, the 102 may have added wrappers to, and/or within, the sender-to-trusted party email 348 to create a path back to the sender 102 in the event that any portion of the message is not successfully received at any point along the path from the sender 102, the first trusted party 106A, the second trusted party 106B, and the recipient 104. The wrappers may include headers that may be decrypted by each node to determine the address of the party immediately preceding that node, so that the nodes may successively decrypt the headers and send the unsuccessfully received message back to the preceding node. In another example implementation, the trusted parties 106A, 106B could add encrypted wrappers to message, the wrappers including the return path for the message and being encrypted according to their own public keys so that they could decrypt and send the message back to the preceding node.

If the trusted party-to-trusted party email 342 is successfully received by the trusted party 106B, then after receiving the trusted party-to-trusted party email 342, the trusted party 106B may remove the trusted party-to-trusted party header 344 from the trusted party-to-trusted party email 342 (216B). The trusted party 106B may also decrypt the encrypted trusted party-to-recipient pseudo-body 336A (218B) shown in FIGS. 3E and 3F to re-form and/or generate the trusted party-to-recipient email 336 shown in FIG. 3D. The trusted party 106B may decrypt the encrypted trusted party-to-recipient pseudo-body 336A using a symmetric key included in the trusted party-to-trusted party trailer 346. The symmetric key included in the trusted party-to-trusted party trailer 346 may have been encrypted by the sender 102 according to a public key associated with the trusted party 106B, and the trusted party 106B may decrypt the symmetric key included in the trusted party-to-trusted party trailer 346 based on a private key associated with the trusted party 106B. The trusted party 106B may also remove the trusted party-to-trusted party trailer 346 from the trusted party-to-trusted party email 342.

The trusted party 106B may send the trusted party-to-recipient email 336, shown in FIG. 3D, to the recipient 104 (220A), similar to the trusted party 106 sending the trusted party-to-recipient email 336 to the recipient 104 (220) as shown and described with respect to FIG. 2A. After receiving the trusted party-to-recipient email 336, the recipient 104 may remove the trusted party-to-recipient header 338 (222), decrypt the encrypted sender-to-recipient pseudo-body 334 (224), and decrypt the primary body 304 (226), as described above with respect to FIG. 2A.

Figure 2C:
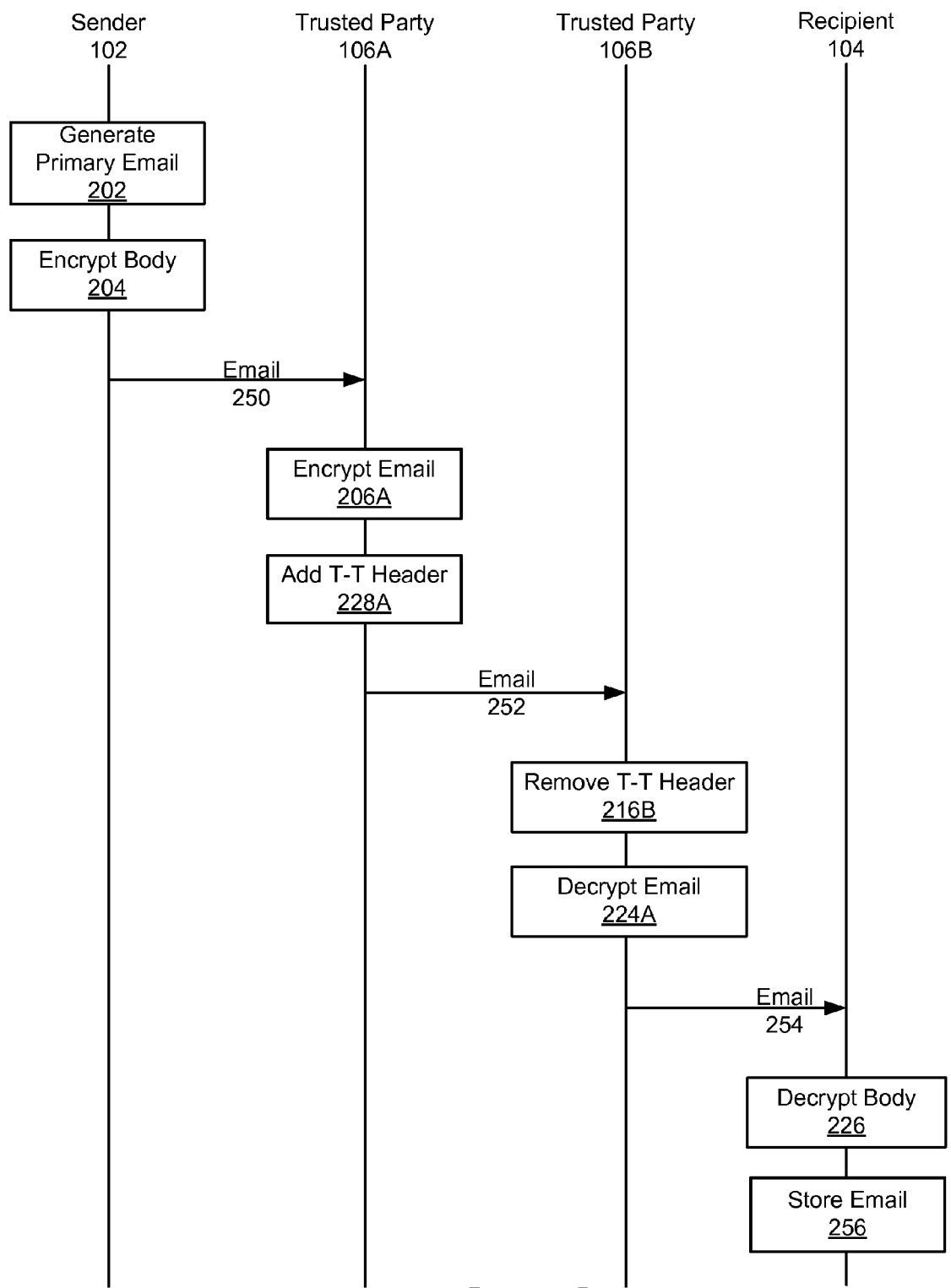
FIG. 2C is a timing diagram showing operations performed by, and messages sent between, a sender, a first trusted party, a second trusted party, and a recipient, in the environment shown in FIG. 1D.

FIG. 2C is a timing diagram showing operations performed by, and messages sent between, the sender 102, the first trusted party 106A, the second trusted party 106B, and the recipient 104, in the environment shown in FIG. 1D. In this example, the sender 102 and recipient 104 may send and receive emails via cloud providers, such as email service providers. The first trusted party 106A may be a cloud service provider associated with and/or providing service such as email service to the sender 102, and/or the second trusted party 106B may be a cloud service provider associated with and/or providing service such as email service to the recipient 104.

In the example shown in FIG. 2C, the sender 102 may generate the primary email (202) and encrypt the body (204) as described above with respect to FIG. 2A. The sender 102 may also send an email 250, such as the primary encrypted email 312 shown in FIG. 3B, to the first trusted party 106A via a safe network 108A. The sender 102 may send the email 250 to the first trusted party 106A using, for example, simple mail transfer protocol (SMTP). In this example, the safe network 108A may be a secure communication channel between the sender 102 and the first trusted party 106A such as a connection via the Internet using Transport Layer Security (TLS) encryption, and the first trusted party 106A may be an email service provider for the sender 102.

The first trusted party 106A may, upon receipt of the primary encrypted email 312/250, encrypt the entire primary encrypted email 312 (206A) so that the primary encrypted email 312 becomes the encrypted sender-to-recipient pseudo-body 334 in a similar manner to the sender 102 encrypting the email (206) as described above with respect to FIG. 2A, and add a trusted party-to-trusted party header (228A) to the encrypted sender-to-recipient pseudo-body 334 to generate a trusted party-to-trusted party email, in a similar manner to the sender 102 adding the trusted party-to-trusted party header (228) as described above with respect to FIG. 2A. The trusted party-to-trusted party header may include an address of the first trusted party 106A in the from field and an address of the second trusted party 108B in the to field. The first trusted party 106A may also add a trusted party-to-trusted party trailer to the encrypted sender-to-recipient pseudo-body 334. The trailer may include fields similar to the fields included in the trailer 314 shown in FIG. 3B. The trailer may also include a signature of the first trusted party 106A. The trailer may also include a symmetric key according to which the primary encrypted email 312 was encrypted to generate the encrypted sender-to-recipient pseudo-body, and which may be encrypted according to a public key associated with the second trusted party 106B.

The first trusted party 106A may send the trusted party-to-trusted party email 252 to the second trusted party 106B via the network 108 using, for example, SMTP. The second trusted party 106B may remove the trusted party-to-trusted party header (216B) and the trusted party-to-trusted party trailer from the trusted party-to-trusted party email as described above with respect to FIG. 2B, and decrypt the encrypted sender-to-recipient pseudo-body 334 to generate and/or re-form the primary encrypted email 312 (224A) in a similar manner to the recipient 104 decrypting the email (224) as described above with respect to FIG. 2A. The second trusted party 106B may decrypt the trusted party-to-trusted party email by decrypting the symmetric key included in the trusted party-to-trusted party trailer using a private key associated with the second trusted party 106B and use the decrypted symmetric key to decrypt the encrypted sender-to-recipient pseudo-body 334.

In one example, the second trusted party 106B may send the primary encrypted email 312 (254) to the recipient 104 via the safe network 108B. The second trusted party 106B may send the primary encrypted email 312 to the recipient 104 using, for example, SMTP. The safe network 108B may be a secure communication channel between the second trusted party 106B and the recipient 104 such as a connection via the Internet using TLS encryption, and the second trusted party 106B may be an email service provider for the recipient 104. Upon receipt of the email from the second trusted party 106B, the recipient 104 may decrypt the primary body 304A of the email (226) as described above with respect to FIGS. 2A and 2B, and may store the email 300 (256).

Figure 2D:
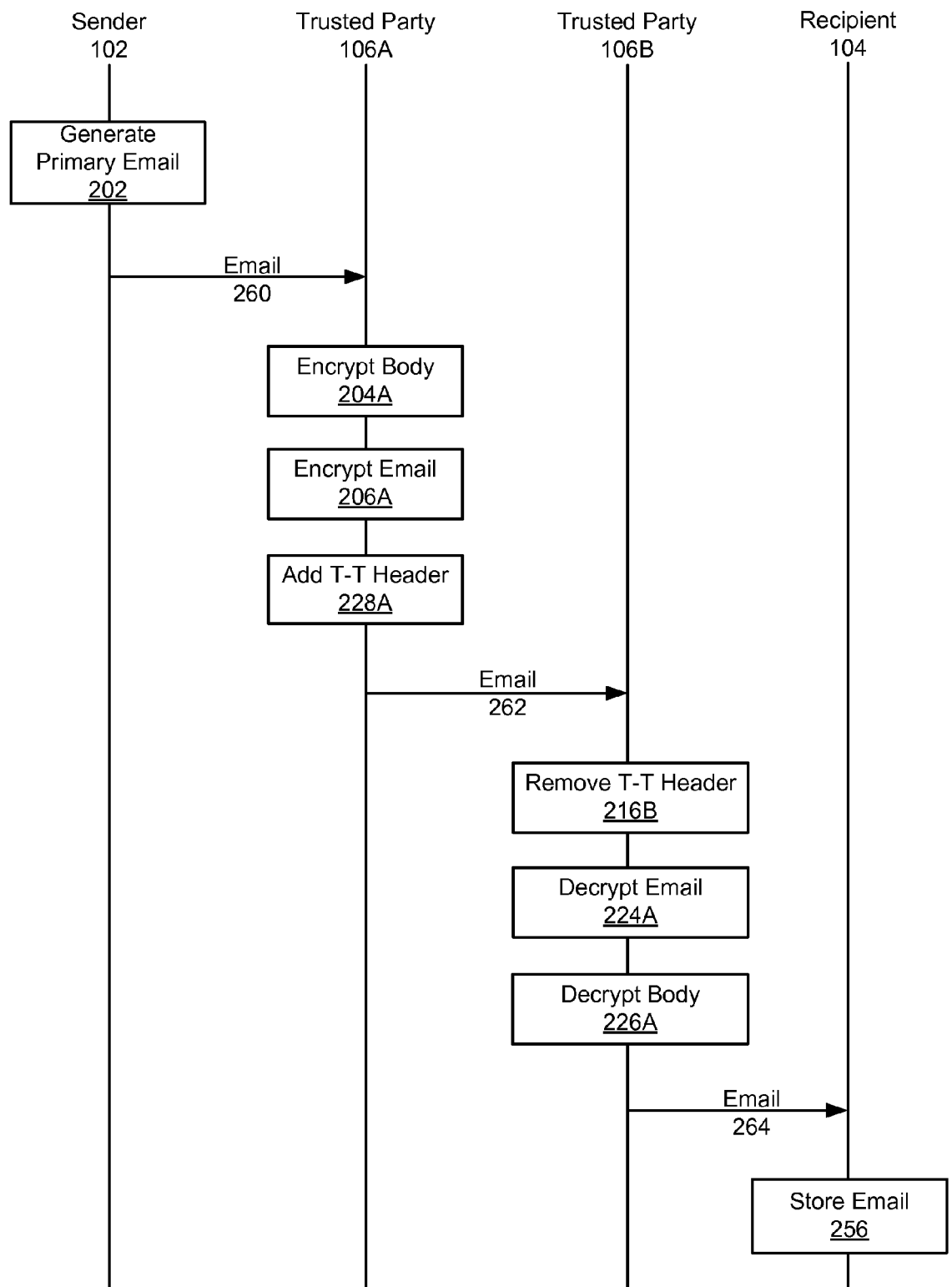
FIG. 2D is another timing diagram showing operations performed by, and messages sent between, a sender, a first trusted party, a second trusted party, and a recipient, in the environment shown in FIG. 1D.

FIG. 2D is another timing diagram showing operations performed by, and messages sent between, the sender 102, the first trusted party 106A, the second trusted party 106B, and the recipient 104, in the environment shown in FIG. 1D. The respective networks and relationships between the sender 102, the first trusted party 106A, the second trusted party 106B, and the recipient 104 may be similar to those described above with respect to FIG. 2C. The generating the email (202), encrypting the email (206A), adding the trusted party-to-trusted party header (228A), removing the trusted party-to-trusted party header (216B), decrypting the email (224A), and storing the email (256) may be similar to the corresponding functions described above with respect to FIG. 2C.

In the example shown in FIG. 2D, the sender 102 may send an email 260 such as the primary email 300 shown in FIG. 3A to the first trusted party 106A, and the first trusted party 106A may encrypt the primary body 304 and/or add the trailer 314 to generate the primary encrypted email 312 (204A) in a similar manner to the sender encrypting the primary body 304 (204). Also in this example, the second trusted party 106B may decrypt the primary body 304A (226A) and remove the trailer 314 to generate the primary email 300 in a similar manner to the recipient 104 decrypting the primary body 304A (226) as described above with respect to FIG. 2A, and send the primary email 300/264 to the recipient 104. In this example, the sender 102 may safely send the primary email 300/260 to the trusted party 106A via the safe and/or secure network 108A, and the second trusted party 106B may safely send the primary email 300/264 to the recipient 104 via the safe and/or secure network 108B.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device including a non-transitory computer-readable storage medium comprising instructions stored thereon that, when executed by at least one processor, are configured to cause a computing system to perform any combination of the methods, functions, and processes described herein, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for protecting a recipient address within a primary email that, when executed by at least one processor, are configured to cause a sender computing system to at least:
   generate the primary email, the primary email including a primary header and a primary body, the primary header including a sender address associated with the sender computing system and the recipient address associated with a recipient client;
   encrypt at least a part of the primary body to generate a primary encrypted email;
   encrypt the primary encrypted email to generate an encrypted sender-to-recipient pseudo-body;
   add a trusted party-to-recipient header to the encrypted sender-to-recipient pseudo-body, the trusted party-to-recipient header including a trusted party address of a trusted party and the recipient address associated with the recipient client, to generate a trusted party-to-recipient email;
   encrypt the trusted party-to-recipient email according to a symmetric key to generate an encrypted trusted party-to-recipient pseudo-body;
   generate a sender-to trusted party email by:
      adding a sender-to-trusted party header to the encrypted trusted party-to-recipient pseudo-body, the sender-to-trusted party header including the sender address and the address of the trusted party; and
      adding a sender-to-trusted party trailer to the encrypted trusted party-to-recipient pseudo-body, the sender-to-trusted party trailer including the symmetric key, the symmetric key being encrypted according to a public key associated with the trusted party; and
   send the sender-to-trusted party email to the trusted party.

2. The non-transitory computer-readable storage medium of claim 1, wherein the encrypting the primary encrypted email includes encrypting the primary encrypted email according to the symmetric key included in the trusted party-to-recipient trailer to generate the encrypted sender-to-recipient pseudo-body.

3. The non-transitory computer-readable storage medium of claim 1, wherein the instructions are further configured to cause the sender computing system to:
   add a trusted party-to-recipient trailer to the encrypted sender-to-recipient pseudo-body, the trusted party-to-recipient trailer including a recipient symmetric key, the recipient symmetric key being encrypted according to a public key associated with the recipient client, the adding the trusted party-to-recipient header and the adding the trusted party-to-recipient trailer to the encrypted sender-to-recipient pseudo-body generating the trusted party-to-recipient email,
   wherein the encrypting the primary encrypted email includes encrypting the primary encrypted email according to the recipient symmetric key included in the trusted party-to-recipient trailer to generate the encrypted sender-to-recipient pseudo-body.

4. The non-transitory computer-readable storage medium of claim 3, wherein the public key associated with the recipient client is included in a public key infrastructure (PKI) certificate associated with the recipient client and the public key associated with the trusted party is included in a PKI certificate associated with the trusted party.

5. The non-transitory computer-readable storage medium of claim 4, wherein the PKI certificate associated with the trusted party is included in a chain of certificates from a PKI certificate associated with the sender computing system and a trusted root.

6. The non-transitory computer-readable storage medium of claim 1, wherein the primary email includes an X.509 certificate.

7. The non-transitory computer-readable storage medium of claim 6, wherein the X.509 certificate includes an extension declaring that a public key included in the X.509 certificate will be used to proxy the primary email via the trusted party.

8. The non-transitory computer-readable storage medium of claim 6, wherein the X.509 certificate includes an extension specifying the address of the trusted party and indicating that the trusted party will decrypt the encrypted trusted party-to-recipient pseudo-body and forward the trusted party-to-recipient email to the recipient client.

9. The non-transitory computer-readable storage medium of claim 6, wherein the X.509 certificate includes:
   a first extension declaring that a public key included in the X.509 certificate will be used to proxy the primary email via the trusted party; and
   a second extension specifying the address of the trusted party and indicating that the trusted party will decrypt the encrypted trusted party-to-recipient pseudo-body and forward the trusted party-to-recipient email to the recipient client.

10. The non-transitory computer-readable storage medium of claim 6, wherein the X.509 certificate includes a certificate signature, the certificate signature authenticating the X.509 certificate and being based on a private key of an entity that issued the certificate.

11. The non-transitory computer-readable storage medium of claim 1, wherein the primary encrypted email further includes a trailer, the trailer including a primary encrypted email signature, the primary encrypted email signature authenticating the sender computing system and being based on a private key associated with the sender computing system.

12. A non-transitory computer-readable storage medium comprising instructions stored thereon for forwarding a sender-to-trusted party email to a trusted party server associated with a recipient client that, when executed by a least one processor, are configured to cause a trusted party computing system associated with a sender client to at least:
  receive, from the sender client, a sender-to-trusted party email, the sender-to-trusted party email including:
    a sender-to-trusted party header including a sender address associated with the sender client and a first trusted party address associated with the trusted party computing system;
    an encrypted trusted party-to-trusted party pseudo-body; and
    a sender-to-trusted party trailer, the sender-to-trusted party trailer including a key for decrypting the encrypted trusted party-to-trusted party pseudo-body, the key being encrypted according to a public key associated with the trusted party computing system;
  remove the sender-to-trusted party header from the sender-to-trusted party email;
  decrypt the encrypted trusted party-to-trusted party pseudo-body to generate a trusted party-to-trusted party email, the trusted party-to-trusted party email including a trusted party-to-trusted party header and an encrypted trusted party-to-recipient pseudo-body, the trusted party-to-trusted party header including the first trusted party address and a second trusted party address associated with the trusted party server associated with the recipient client; and
  send the trusted party-to-trusted party email to the trusted party server associated with the recipient client.

13. The non-transitory computer-readable storage medium of claim 12, wherein the decrypting the encrypted trusted party-to-trusted party pseudo-body includes:
  decrypting the key included in the sender-to-trusted party trailer according to a private key associated with the trusted party computing system; and
  decrypting the encrypted trusted party-to-trusted party pseudo-body with the decrypted key.

14. A non-transitory computer-readable storage medium comprising instructions stored thereon for forwarding a sender-to-trusted party email to a recipient client that, when executed by a least one processor, are configured to cause a trusted party computing system to at least:
  receive, from a sender client, a sender-to-trusted party email, the sender-to-trusted party email including:
    a sender-to-trusted party header including a sender address associated with the sender client and a trusted party address associated with the trusted party computing system;
    an encrypted trusted party-to-recipient pseudo-body; and
    a sender-to-trusted party trailer, the sender-to-trusted party trailer including a key for decrypting the encrypted trusted party-to-recipient pseudo-body;
  remove the sender-to-trusted party header from the sender-to-trusted party email;
  decrypt the encrypted trusted party-to-recipient pseudo-body to generate a trusted party-to-recipient email, the trusted party-to-recipient email including a trusted party-to-recipient header and an encrypted sender-to-recipient pseudo-body, the trusted party-to-recipient header including the trusted party address associated with the trusted party computing system and a recipient address associated with the recipient client, the encrypted sender-to-recipient pseudo-body including an encrypted email from the sender client to the recipient client; and
  send the trusted party-to-recipient email to the recipient client.

15. The non-transitory computer-readable storage medium of claim 14, wherein the trusted party computing system is associated with the sender client.

16. The non-transitory computer-readable storage medium of claim 14, wherein the trusted party computing system is associated with the recipient client.

17. The non-transitory computer-readable storage medium of claim 14, wherein the key included in the sender-to-trusted party trailer is encrypted according to a public key associated with the trusted party computing system.

18. The non-transitory computer-readable storage medium of claim 17, wherein the decrypting the encrypted trusted party-to-recipient pseudo-body includes:
  decrypting the key included in the sender-to-trusted party trailer according to a private key associated with the trusted party computing system; and
  decrypting the encrypted trusted party-to-recipient pseudo-body with the decrypted key.

19. The non-transitory computer-readable storage medium of claim 14, wherein the decrypting the encrypted trusted party-to-recipient pseudo-body includes decrypting the encrypted trusted party-to-recipient pseudo-body based on the key included in the sender-to-trusted party trailer.

20. A method for forwarding a sender-to-trusted party email to a trusted party server associated with a recipient client, the method being performed by a trusted party computing system associated with a sender client, the method comprising:
  receive, from the sender client, a sender-to-trusted party email, the sender-to-trusted party email including:
    a sender-to-trusted party header including a sender address associated with the sender client and a first trusted party address associated with the trusted party computing system;
    an encrypted trusted party-to-trusted party pseudo-body; and
    a sender-to-trusted party trailer, the sender-to-trusted party trailer including a key for decrypting the encrypted trusted party-to-trusted party pseudo-body, the key being encrypted according to a public key associated with the trusted party computing system;
  remove the sender-to-trusted party header from the sender-to-trusted party email;
  decrypt the encrypted trusted party-to-trusted party pseudo-body to generate a trusted party-to-trusted party email, the trusted party-to-trusted party email including a trusted party-to-trusted party header and an encrypted trusted party-to-recipient pseudo-body, the trusted party-to-trusted party header including the first trusted party address and a second trusted party address associated with the trusted party server associated with the recipient client; and send the trusted party-to-trusted party email to the trusted party server associated with the recipient client.

21. The method of claim 20, wherein the decrypting the encrypted trusted party-to-trusted party pseudo-body includes:

decrypting the key included in the sender-to-trusted party trailer according to a private key associated with the trusted party computing system; and decrypting the encrypted trusted party-to-trusted party pseudo-body with the decrypted key.

* * * * *